May 5, 1959 R. D. TOWER 2,885,041
FASTENING DEVICE
Filed Nov. 12, 1953

INVENTOR
Robert D. Tower
BY
ATTORNEY

United States Patent Office 2,885,041
Patented May 5, 1959

2,885,041

FASTENING DEVICE

Robert D. Tower, Lansing, Mich., assignor to General Motors Corporation, Detroit, Mich., a corporation of Delaware Application November 12, 1953, Serial No. 391,430

1 Claim. (Cl. 189—88)

This invention relates to fasteners and more particularly to fasteners especially adapted to secure flanged objects to a supporting member.

It is frequently necessary to secure ornamental moldings and the like to the outside of a supporting panel where the means for securing the molding to the panel must not be visible. In such cases, only the inside of the panel is accessible once the molding has been applied to the outside of the panel. Many types of fasteners are being satisfactorily employed for securing small and medium size moldings in this manner. A common type is the double snap fastener, one end of which snaps between the flanges of the molding and the other end of which snaps into an aperture in the panel. Another common type is the sheet metal fastener which engages studs projecting from the moldings and extending through apertures in the supporting panel by means of spring tongues formed in the fastener.

Though the above common fastening devices may satisfactorily secure moldings of usual size, there has developed a need for a fastener which will satisfactorily secure larger and heavier moldings which are coming into more extensive use. Heavier moldings, especially those mounted on automobiles where they are subjected to severe engine and road vibrations, tend to overstress snap fasteners and the like so that looseness and rattling are more likely to develop. For this reason heavier moldings require more positive securing means than do the lighter moldings.

It is proposed to provide a fastener which is relatively easily applied in that it may be snapped into initial molding receiving position on the panel. It is further proposed to provide a fastener in which there is provided a more positive clamping means of securing the molding to the supporting panel and with the use of which the final tightening of the assembly can still be done entirely from the inside of the panel.

Figure 1:
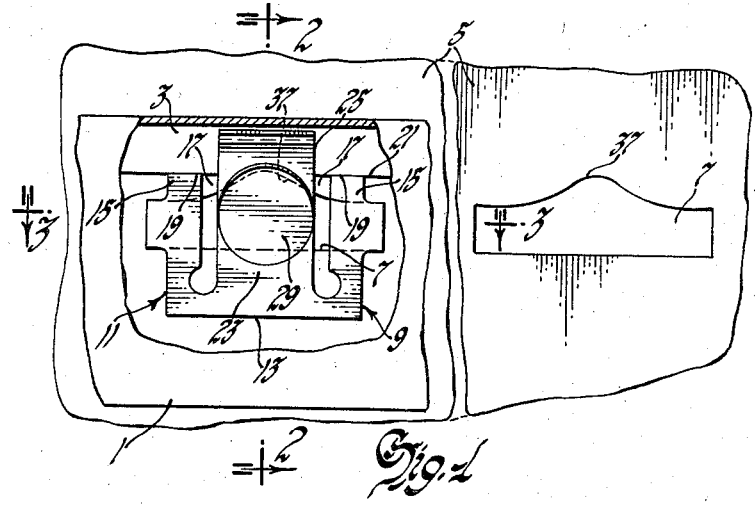
Figure 1 is an elevational view partly broken away of a fastener installation embodying the invention.
Figure 2:
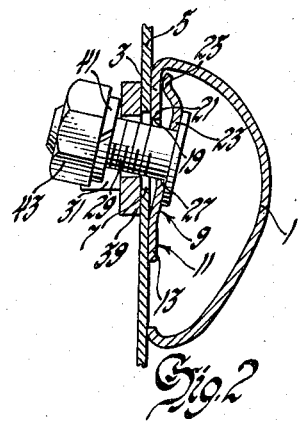
Figure 2 is a cross-sectional view taken along the plane of line 2—2 of Figure 1.
Figure 3:
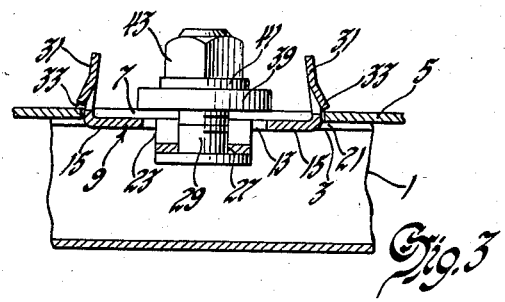
Figure 3 is a cross-sectional view taken along the plane of line 3—3 of Figure 1.
Figure 4:
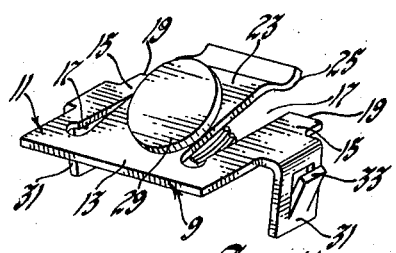
Figure 4 is a perspective view of the fastener employed in the installation shown in Figures 1–3.
Figure 5:
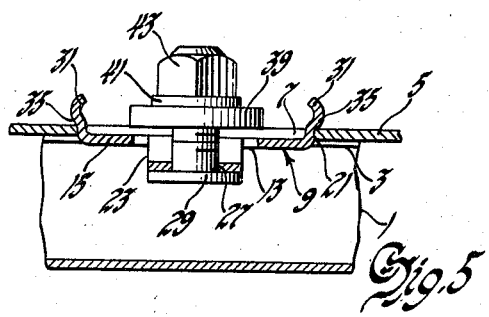
Figure 6:
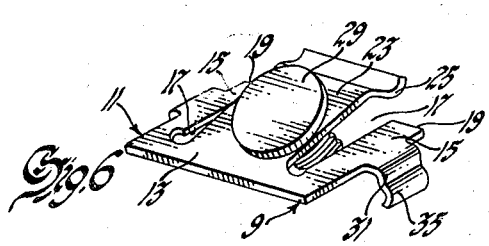

Figures 5 and 6 correspond to Figures 3 and 4 respectively and show a modified form of fastener embodying the invention.

Referring to the drawings in more detail, an object such as a molding 1 provided with a flange 3 is secured to a panel 5 provided with apertures 7 by means of a fastener generally designated 9.

The fastener 9, which is preferably constructed from spring metal, may be formed to provide a continuous support 11 having an intermediate portion 13 and ends 15 extending from the intermediate portion 13 in the same general direction and forming a recess 17 therebetween.

It is to be noted that the edges across the ends 15 provide abutments 19 for engaging the edge 21 of the flange 3. In the embodiment shown, the abutments 19 are straight and in alignment to conform to the straight edge 21. It can be appreciated, however, that the abutments 19 may be of any shape and relative position to accommodate the flange of the particular object to be secured.

A tongue 23 extends from the intermediate portion 13 in the direction of the recess 17 and beyond the abutments 19 so that the tongue end 25 may be clamped over the flange 3. It can also be appreciated that the tongue end 25 is shown to extend beyond abutments 19 only because the flange 3 has a straight edge 21. It is conceivable that with some other shape of flange the tongue end 25 need not extend beyond the abutments 19. It is further to be understood that the width of the tongue 23 is not critical, except from the strength consideration. Since the tongue end 25 is to be clamped over the flange 3, the tongue end 25 is preferably formed out of the plane of the support 11 so that the flange 3 may be inserted between the panel 5 and the tongue end 25. Also, the tongue end 25 is provided with means to hold the tongue end 25 in clamping engagement with flange 3. For this purpose, as in the preferred embodiment shown, tongue end 25 may be provided with an aperture 27 so that bolt 29 may be fixed therein, with the threaded end of bolt 29 extending downwardly through the recess 17.

It is desirable to be able to fix the fastener 9 in initial flange-receiving position on panel 5. To this end the fastener 9 may be provided with arms 31 having shoulders 33, as shown in Figures 1–4, or 35, as shown in Figures 5 and 6. Shoulders 33 and 35 are equivalent in function though different in structure, the latter being stamped out of arms 31. Thus the arms 31 may be inserted through the aperture 7 so that support 11 engages the outside of the panel 5 and the shoulders 33 or 35 engage the inside of the panel 5 at the ends of aperture 7.

In assembly, a fastener 9 is fixed to the panel 5 as described above at each of the apertures 7. It will be noted that the threaded end of bolt 29 will extend through the aperture 7, which may be made wider at 37 to accommodate the bolt 29 since the bolt is perpendicular to the tongue 23 and oblique to the support 11. The molding 1 is applied to the panel 5 so that the flange 3 lies between the panel 5 and the tongue end 25 and so that the abutments 19 engage the edge 21 of the flange 3. With the molding thus held in initial position, a flat washer 39 and a lock washer 41 may be applied to the bolt 29 and nut 43 may be tightened on the bolt 29 so that tongue 23 is pulled toward panel 5 until tongue end 25 clamps flange 3 against panel 5. It will be noted also that tongue end 25 may be arched in some manner to provide a spring action to further prevent loosening of the nut 43.

With the use of the above described fastener, even the larger and heavier moldings may be positively and tightly secured to a panel so that the installation will better resist relatively severe vibrations, such as that encountered in normal operation of motor vehicles, than do snap fasteners presently used.

What is claimed is:

In combination with a support panel and a molding having upper and lower inwardly extending flanges, a fastener for securing said molding to one side of said panel by only one of said flanges, said panel having a fastener receiving aperture formed therein, said fastener being formed to provide a continuous support section having generally parallel arms extending therefrom in the plane of said support and said one flange and into abutting engagement with said one flange, a tongue obliquely struck from the plane of said support section intermediate said ends, said tongue having a flat intermediate portion provided with a bolt receiving aperture and terminating at an outwardly extending reversely curved molding flange engaging end, and a bolt and nut assembly received normally through said tongue aperture and obliquely through said panel aperture, said parallel arms each having an outwardly extending arm angularly bent opposite said tongue to provide temporary panel engagement means, each of said arms having an outwardly extending retaining shoulder in temporary engageable fastener retaining relationship with the side of said panel opposite said molding, said bolt and nut assembly when tightened retaining said one molding flange in tightly secured stacked relation intermediate said fastener tongue flange engaging end and one side of said panel and disengaging said retaining shoulders with said panel.

References Cited in the file of this patent

UNITED STATES PATENTS

| | | |
|---|---|---|
| 1,856,652 | Muller | May 3, 1932 |
| 2,201,335 | Cotter | May 21, 1940 |
| 2,324,654 | Tinnerman et al. | July 20, 1943 |
| 2,330,675 | Brown | Sept. 28, 1943 |
| 2,476,207 | Brown | July 12, 1949 |
| 2,610,375 | Churchill | Sept. 16, 1952 |
| 2,644,607 | Henkel | July 7, 1953 |
| 2,657,775 | Dunham | Nov. 3, 1953 |
| 2,798,277 | Flora | July 9, 1957 |